(No Model.)
E. I. MOREY.
CLEVIS.
No. 363,252. Patented May 17, 1887.
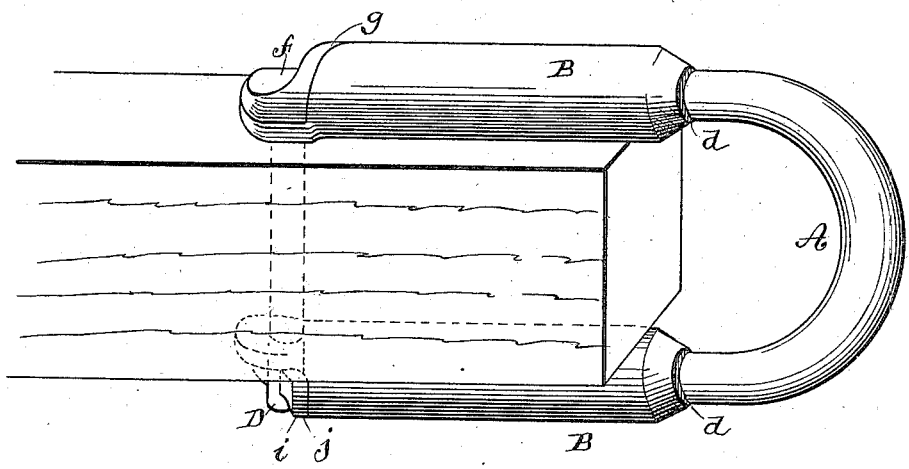
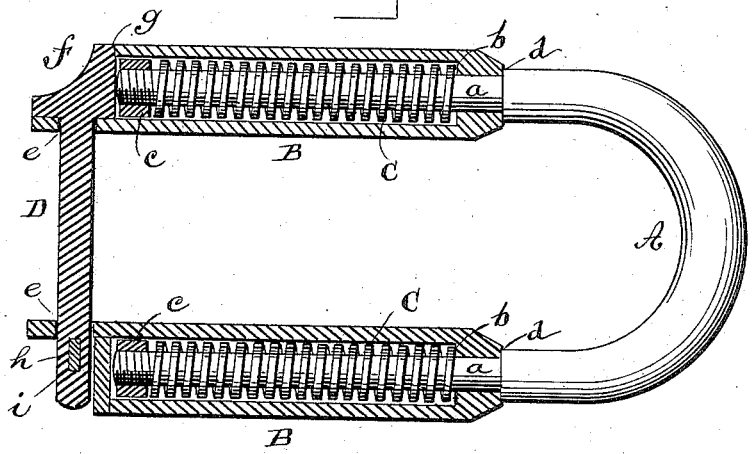
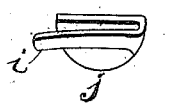
WITNESSES:
D. D. Mott
C. Sedgwick
INVENTOR:
E. I. Morey
BY Munn & Co.
ATTORNEYS.

UNITED STATES PATENT OFFICE.

EDWARD I. MOREY, OF WHITEWATER, WISCONSIN.

CLEVIS.

SPECIFICATION forming part of Letters Patent No. 363,252, dated May 17, 1887.

Application filed February 18, 1887. Serial No. 228,072. (No model.)

*To all whom it may concern:*

Be it known that I, EDWARD I. MOREY, of Whitewater, in the county of Walworth and State of Wisconsin, have invented a new and Improved Clevis, of which the following is a specification, reference being had to the annexed drawings, forming a part thereof, in which—

Figure 1 is a perspective view of my improved clevis. Fig. 2 is a longitudinal section, and Fig. 3 is a perspective view of the key employed in holding the clevis-bolt in its place.

Similar letters of reference indicate corresponding parts in all the views.

The object of my invention is to provide a yielding clevis for attachment to plow-beams, singletrees, &c., for relieving the horses and harness from strain or injury in starting the vehicle or implement to which the clevis may be attached.

My invention consists in a clevis formed of a U-shaped bar having its ends inserted in spring-barrels, and provided with nuts or collars on their inner ends for receiving the pressure of the springs contained by the barrels, and in the combination, with the barrels, of a bolt and key for attaching the clevis to the object to be drawn, the bolt and key being arranged to close the ends of the spring-barrels.

The arms $a$ of the U-shaped rod A, forming the body of the clevis, are reduced in diameter and inserted in spring-barrels B, which are bored at their extremities to fit the arms $a$ of the rod A, and are counterbored for receiving the springs C, which abut upon the shoulders $b$, formed by counterboring the barrels B. The extremities of the rod A are provided with nuts $c$, which press the inner ends of the springs C and bring the shoulders $d$ of the rod A against the ends of the barrels B. The sides of the barrels B adjoining the evener or other object in connection with which the clevis is used are prolonged and provided with apertures $e$, for receiving the bolt D. The bolt D has a head, $f$, provided with a semicircular face, $g$, adapted to close the end of one of the barrels B, and in the opposite end of the bolt is formed a transverse hole, $h$, in which is inserted a key, $i$, having a semicircular head, $j$, adapted to close the end of the other spring-barrel B, the key thus being made to serve the double purpose of closing the barrel and of holding the bolt D in its place.

Any outward pull on the U-shaped rod A draws the arms $a$ of the said rod outwardly, putting the springs C under more or less compression, according to the amount of force exerted on the clevis. The yielding of the clevis in this manner prevents injury to the animals hitched to it, and it also prevents injury to the harness and to the vehicle or implement in connection with which the clevis is used.

It is obvious that I may employ springs of different kinds in lieu of the springs shown in the drawings. Therefore I do not limit or confine myself to the use of any particular kind of springs.

Having thus fully described my invention, I claim as new and desire to secure by Letters Patent—

1. An improved clevis consisting of two barrels, a U-shaped rod having its arms fitting in the barrels, springs surrounding the said arms, and a bolt for securing the clevis to the object upon which it is used, substantially as herein shown and described.

2. In a clevis, the combination, with the barrels B, having open rear ends and apertured extensions, of the apertured bolt D, provided with a head having a semicircular face, $g$, and the key $i$, having a semicircular head, $j$, substantially as herein shown and described.

3. As an improved article of manufacture, a spring-clevis formed of the U-shaped rod A, having arms $a$, reduced in diameter, the spring-barrels B, adapted to receive the arms $a$, the spiral springs C, surrounding the arms $a$ and inclosed by the barrels B, nuts $c$, received on the ends of the arms $a$, the bolt D, inserted in prolongations of the ends of the barrels and provided with a head, $f$, having a semicircular face, $g$, and the key $i$, provided with the semicircular head $j$, substantially as described.

EDWARD I. MOREY.

Witnesses:
 HENRY VAN VOORHES,
 W. M. KING.